Patented May 8, 1951

2,551,893

UNITED STATES PATENT OFFICE 2,551,893

ANIONIC FLOTATION PROCESS FOR BENEFICIATING IRON ORE

Ronald J. Morton, Duluth, Minn., assignor to Oliver Iron Mining Company, a corporation of Minnesota No Drawing. Application May 18, 1948, Serial No. 27,829

9 Claims. (Cl. 241—20)

This invention relates to anionic flotation processes for beneficiating iron ores having a siliceous gangue, and particularly to such processes wherein the gangue is floated from the iron minerals.

Broadly such processes already are known. Those with which I am familiar have been adopted without change from processes previously used for beneficiating phosphate ores. Crushed ore is mixed with water and finely ground to form a pulp. An anion active collector and cooperating reagents are mixed with the pulp, which is then subjected to froth flotation. Heretofore the identical reagents have been used for floating siliceous gangue from both iron ores and phosphate ores.

Anion active collectors commonly used in such processes include the higher fatty acids, the resin acids, the soaps of each, or mixtures of the foregoing substances. The usual cooperating reagents heretofore have been starch and lime. The starch is first solubilized by some well known method, such as by treatment with a caustic, an acid or an oxidizing agent.

The accepted theory of the cooperating reagents is that starch depresses iron or phosphate mineral particles and that lime activates siliceous particles by being absorbed on their surfaces and thus furnishing an affinity for the anion active collector. It is probable that the cooperating reagents function to some extent in other ways. For example, lime may influence the depression of some of the ore constituents or it may modify the froth. For convenience in describing and claiming the invention, I refer to the one type of cooperating reagent exemplified by starch as a "depressant" and to the other type exemplified by lime as an "activator." In using these terms, I do not intend to confine the invention to any particular theory of flotation reactions, nor to exclude the possibility that the cooperating reagents may have other functions.

The principal object of the present invention is to provide improved anionic flotation processes for floating gangue from iron ores wherein the pulp consists of the usual water, finely divided ore, anion active collecting agent and starch depressant and a novel and more efficient activator, namely Portland cement.

A further object of the invention is to provide an improved activator, Portland cement, for anionic flotation of siliceous gangue from iron ores.

The process of the present invention is suited for beneficiating low grade iron ores in which the gangue is largely quartz and silicate minerals and the iron bearing minerals are principally oxides or carbonates of iron. Initially a feed of crushed ore is mixed with water and ground to suitable fineness for treatment by flotation, commonly at least as fine as minus 100 mesh. Thus an aqueous pulp is formed containing anywhere from 10 to 70 percent solids by weight.

Portland cement is introduced to the pulp either as a dry powder or a water slurry in an amount within the range 0.5 to 4.0 pounds of cement per ton of feed ore on a dry basis. Preferably the pulp is then conditioned by agitation for a few minutes before adding the other reagents. Conveniently the Portland cement may be introduced to the aqueous pulp before the final grinding. This grinding step may then serve also to condition the pulp.

Alkali is introduced to the pulp in an amount sufficient to produce a pH value of 10.0 to 12.0. With a pulp pH below 10.0 there is not sufficient selectivity to depress the iron minerals differentially from the gangue minerals. A pulp pH of over 12.0 has no advantage and usually the iron minerals are not as effectively depressed and the flotation is more difficult to control. Suitable alkalies for furnishing the desired pH value are sodium hydroxide, potassium hydroxide, and sodium metasilicate. The amount of free alkali introduced is governed by the type of starch to be introduced subsequently and also by the optimum pH value for any particular ore, as determined experimentally. If caustic starch is used, less alkali is needed to furnish the desired pH than if acid or gelatinized starch is used.

Next starch is introduced to the pulp in an amount within the range 0.5 to 8.0 pounds of starch per ton of feed ore on a dry basis. The starch may be introduced either as a solution or a colloidal suspension and may be prepared by any of several well-known methods. These methods include dissolving starch in water by (a) introducing sodium hydroxide to produce causticized starch, (b) introducing an oxidizing agent to produce oxidized starch, (c) boiling the starch in water to form gelatinized starch, or (d) introducing acid to an aqueous starch suspension and thus producing a solution of acid-treated starch. Good results have also been attained using products of the partial hydrolysis of starch, such as dextrines and gums. The pulp is again conditioned by agitation after the starch addition.

Finally the anion active collecting agent is introduced to the pulp in an amount within the range 1.0 to 5.0 pounds of reagent per ton of feed ore on a dry basis. The reagent may be any of the higher fatty acids, the resin acids, the soaps of each or mixtures of the foregoing substances. Specific examples of collecting agents I have found suitable are talloel and its soap, either crude or purified, oleic acid, sodium oleate, sodium resinate, and mixtures of sodium oleate and sodium resinate. The talloel materials are by-products from paper manufacture and are, therefore, cheap and readily available. There are numerous other higher fatty acids and resin acids and soaps of each that are known to be suitable as anionic collecting reagents; hence I do not wish to be limited to those I have specifically mentioned.

I have stated the preferred sequence for introducing the various reagents to the pulp, namely, first the activator and alkali, second the depressor, and third the collector. Nevertheless, it is possible to vary this sequence or to introduce the reagents simultaneously; hence I do not wish to be limited to the preferred sequence.

After the reagents have been mixed with the pulp as described, the latter is subjected to froth flotation in any suitable apparatus. The siliceous gangue is removed as a froth product and may be re-treated for recovery of additional iron minerals. The re-treatment conveniently is the same as the original treatment with additional quantities of the same reagents introduced.

In order to disclose the invention more fully, the following examples state preferred ways of practicing the process. However, I do not wish the invention to be limited to the processes described in detail in these examples, but only by the scope of the appended claims.

EXAMPLE 1

The ore used in this example was a low grade "wash type" ore from the western section of the Mesabi Range of Minnesota. The ore was crushed to a minus 8 mesh, then ground with water at 50 percent solids until 83 percent of the material was minus 325 mesh. One pound of Portland cement per ton of feed ore on a dry basis was introduced into the pulp before the last grinding. After the ore in the pulp had been ground, four pounds of causticized starch per ton of feed ore on a dry basis was added to the pulp, after which the pulp was conditioned by agitation for a three minute period. Following the conditioning step, one pound of a talloel soap (made by saponifying a talloel product sold as "Facoil") per ton of feed ore on a dry basis was added as a collecting agent and the pulp was subjected to a froth flotation process. A pH of 11.5 was obtained in this pulp by the presence of alkalies in the cement and the starch solution. The rougher silica froth produced was repulped and refloated once with one additional pound of starch and 0.10 additional pounds of talloel per ton of original solids. The results were as follows:

*Table I*

| Product | Per Cent Wt. | Per Cent Fe | Per Cent Fe Recovered |
|---|---|---|---|
| Feed | 100.0 | 34.0 | 100.0 |
| Tailings: Cleaner Overflow | 50.2 | 7.9 | 11.6 |
| Concentrates: | | | |
| Cleaner Underflow | 10.5 | 52.1 | 16.1 |
| Rougher Underflow | 39.3 | 62.6 | 72.3 |
| Composite (Cleaner Underflow+Rougher Underflow) | 49.8 | 60.4 | 88.4 |

EXAMPLE 2

A series of tests were made using various amounts of Portland cement with the same procedure and ore as in Example 1. The results are summarized in Table II. The cleaner underflow product and the rougher underflow product are combined and called "concentrates" and the cleaner overflow is called "Tailing." This same method of reporting has been used in Tables III, IV, VI, and VII. These results show that an excessive amount of cement is detrimental as it tends to depress silica.

*Table II*

| Lbs. Cement per Ton Ore | Per Cent Wt. | | Per Cent Fe | | Per Cent Fe Recovered Conc. |
|---|---|---|---|---|---|
| | Conc. | Tail | Conc. | Tail | |
| None | 76.2 | 23.8 | 43.5 | 5.2 | 96.4 |
| 0.5 | 53.2 | 46.8 | 58.0 | 7.1 | 90.3 |
| 1.0 (Example 1) | 49.8 | 50.2 | 60.4 | 7.9 | 88.4 |
| 2.0 | 49.0 | 51.0 | 59.0 | 10.1 | 84.9 |
| 4.0 | 77.0 | 23.0 | 43.0 | 14.4 | 97.0 |

EXAMPLE 3

Following the procedure of Example 1, tests were made on the same ore, but varying the pH of the pulp at the start of the flotation step. The results are summarized at Table III. These results show that increase in pulp pH decreases the iron recovery, but increases the grade of the iron concentrates.

Table III shows that for the particular ore treated, best results are obtained in the pH range between 11 and 12. For other ores the optimum pH range may be lower or higher, and is best determined by experimentation.

*Table III*

| NaOH Lbs. per Ton | pH Pulp | Per Cent Wt. | | Per Cent Fe | | Per Cent Fe Recovered Conc. |
|---|---|---|---|---|---|---|
| | | Conc. | Tail | Conc. | Tail | |
| None | 9.6 | 85.0 | 15.0 | 39.6 | 6.8 | 97.1 |
| 0.20 | 10.3 | 70.8 | 29.2 | 45.7 | 7.7 | 93.5 |
| 0.60 | 10.9 | 61.4 | 38.6 | 51.7 | 6.0 | 93.2 |
| 0.80 | 11.2 | 54.9 | 45.1 | 56.1 | 7.5 | 90.1 |
| 2.00 | 11.5 | 50.8 | 49.2 | 60.5 | 7.4 | 89.4 |
| 6.00 | 12.0 | 48.3 | 51.7 | 61.7 | 9.3 | 86.1 |

EXAMPLE 4

Following the procedure of Example 1, tests were made on the same ore but using starches that were solubilized by various methods. In each case four pounds of starch was added per ton of ore on a dry basis and the pH of the pulp was adjusted to 11.0 to 11.2 with sodium hydroxide. All of the solubilized starches that were tried were effective in depressing the iron minerals but insoluble corn starch added as a dry powder was ineffective. The results are summarized in Table IV; the method of preparation of each starch follows this table.

*Table IV*

| Type Starch Used | Per Cent Wt. | | Per Cent Fe | | Per Cent Fe Recovered Conc. |
|---|---|---|---|---|---|
| | Conc. | Tails | Conc. | Tails | |
| Caustic Starch | 54.9 | 45.1 | 56.1 | 7.5 | 90.1 |
| Boiled Starch | 55.2 | 44.8 | 55.2 | 8.8 | 89.5 |
| Acid Treated Starch | 52.9 | 47.1 | 58.2 | 8.1 | 89.0 |
| Oxidized Starch | 50.1 | 49.9 | 59.1 | 8.9 | 87.0 |
| Dextrine 152 | 47.5 | 52.5 | 62.1 | 8.9 | 86.4 |
| Dry Corn Starch | 14.5 | 85.5 | 24.3 | 36.1 | 10.3 |

Caustic starch

Corn starch was causticized by adding a sufficient amount of sodium hydroxide to a slurry, containing 2.2 percent starch, to cause the starch to dissolve.

Boiled starch

A paste of corn starch and water was added slowly to boiling water and then boiled for five minutes. The starch gelatinized and formed a 2.2 percent solution.

Acid treated starch

Sufficient sulphuric acid was added to a corn starch-water suspension to cause the starch to dissolve. The solution was boiled one minute to complete the digestion and the final solution contained 2.2 percent starch.

Oxidized starch

The starch in a water-corn starch suspension was oxidized with a sufficient amount of potassium permanganate to dissolve it at boiling temperature. The final solution contained 2.2 percent starch.

Dextrine 152

Dextrine 152 is a commercial partially hydrolyzed starch prepared by treating corn starch with heat and acid. The dextrine was dissolved in warm water to form a solution containing 2.2 percent dextrine.

Dry corn starch

Dry corn starch was added to the flotation cell and the pulp was conditioned for three minutes before the soap addition.

EXAMPLE 5

A sample of "Taconite" ore from the Mesabi Range was treated by the same procedure as in Example 1. After preparing and grinding this ore in the manner described in Example 1 (the same manner as the wash ore), 84.5 percent of the ground material was minus 325 mesh. The results are summarized in Table V.

Table V

| Product | Per Cent Wt. | Per Cent Fe | Per Cent Fe Recovered |
|---|---|---|---|
| Feed | 100.0 | 34.8 | 100.0 |
| Tailing: Cleaner Overflow | 48.8 | 12.8 | 18.0 |
| Concentrates: | | | |
| Cleaner Underflow | 15.4 | 44.6 | 19.8 |
| Rougher Underflow | 35.8 | 60.5 | 62.2 |
| Composite (Cleaner Underflow+Rougher Underflow) | 51.2 | 55.7 | 82.0 |

EXAMPLE 6

Following the procedure of Example 1, tests were made on the same low grade "wash type" ore, but using different alkalies for furnishing the desired alkalinity. The results are summarized in Table VI. Sodium hydroxide and potassium hydroxide are shown to be the most effective alkalies. Of these two potassium hydroxide shows slightly better results, but sodium hydroxide is cheaper and therefore preferred. Ammonium hydroxide gives a fair separation, but excessive quantities are required to furnish the required alkalinity. Sodium carbonate and sodium orthosilicate are ineffective, since they are not sufficiently alkaline to furnish a pH greater than 10 and they act as a depressant for the gangue. Sodium metasilicate is satisfactory.

Table VI

| Alkali | #/T | pH | Concentrate | | | Tailing | |
|---|---|---|---|---|---|---|---|
| | | | Per Cent Wt. | Per Cent Fe | Per Cent Fe Recov. | Per Cent Wt. | Per Cent Fe |
| NaOH | 0.80 | 11.2 | 54.9 | 56.1 | 90.1 | 45.1 | 7.5 |
| Do | 2.00 | 11.5 | 50.8 | 60.5 | 89.4 | 49.2 | 7.4 |
| KOH | 1.20 | 11.0 | 58.8 | 55.6 | 94.2 | 41.2 | 4.9 |
| Do | 3.00 | 11.6 | 51.8 | 62.0 | 92.6 | 48.2 | 5.3 |
| NH₄OH | 14.00 | 10.7 | 61.6 | 53.2 | 94.8 | 38.4 | 4.7 |
| Do | 30.00 | 10.9 | 60.7 | 53.2 | 94.5 | 39.3 | 4.8 |
| Na₂CO₃ | 2.00 | 9.8 | 89.8 | 37.0 | 97.3 | 10.2 | 9.0 |
| Do | 5.00 | 9.8 | 93.4 | | | 6.6 | |
| Na₂SiO₃ | 2.00 | 10.7 | 68.6 | 47.6 | 95.1 | 31.4 | 4.9 |
| Do | 5.00 | 11.1 | 58.2 | 55.7 | 93.3 | 41.8 | 5.6 |
| Na₄SiO₄ | 2.00 | 9.8 | 75.2 | 39.8 | 86.3 | 24.8 | 19.1 |
| Do | 5.00 | 10.0 | 89.3 | 35.8 | 95.3 | 10.7 | 14.9 |

EXAMPLE 7

Following the procedure of Example 1, tests were made on the same low grade "wash type" ore, but using different anion active collectors. The results are summarized in Table VII. In each test Portland cement (one pound per ton) was used as the gangue activator and caustic starch (four pounds per ton) was used as the iron mineral depressant. The pH value of the pulp was adjusted to about 11.2 with sodium hydroxide. The results establish that mixtures of resinate and fatty acid soaps furnish a very satisfactory separation. Such mixtures may be obtained by mixing the individual components or from naturally occurring mixtures known as "sulfate soap" or "soap skimming," or "saponified talloel."

Table VII

| Collector | #/T | Concentrate | | | Tailings | |
|---|---|---|---|---|---|---|
| | | Per Cent Wt. | Per Cent Fe | Per Cent Fe Recov. | Per Cent Wt. | Per Cent Fe |
| Purified talloel soap | 1.00 | 54.9 | 56.1 | 90.1 | 45.1 | 7.5 |
| Impure talloel soap | 5.00 | 50.6 | 59.9 | 89.1 | 49.4 | 7.5 |
| Oleic Acid | 2.00 | 90.6 | 37.8 | 97.6 | 9.4 | 8.8 |
| Sodium Oleate | 3.00 | 93.7 | 37.5 | 98.5 | 6.3 | 8.7 |
| Sodium Resinate | 1.00 | 71.3 | 41.7 | 86.3 | 28.7 | 15.8 |
| Mixture of sodium oleate and sodium resinate | 3.00 | 69.1 | 46.8 | 94.1 | 30.9 | 6.6 |

I claim:

1. A process for separation of siliceous gangue from an aqueous pulp of finely divided iron ore containing 10 to 70 percent solids comprising mixing with the pulp 0.5 to 4.0 pounds of Portland cement per ton of feed ore, 1 to 5 pounds per ton of feed ore of an anion active collector of the group consisting of resin acids, higher fatty acids, resin acid soaps, higher fatty acid soaps, and mixtures of the foregoing, and 0.5 to 8.0 pounds per ton of feed ore of solubilized starch, adjusting the pH value of the pulp to 10.0 to 12.0, and subjecting the pulp thus prepared to froth flotation.

2. A process for separation of siliceous gangue from an aqueous pulp of finely divided iron ore containing 10 to 70 percent solids comprising mixing with the pulp 0.5 to 4.0 pounds of Portland cement per ton of feed ore, 1 to 5 pounds per ton of feed ore of resin acid anion active collector, and 0.5 to 8.0 pounds per ton of feed ore of solubilized starch, adjusting the pH value of the pulp to 10.0 to 12.0, and subjecting the pulp thus prepared to froth flotation.

3. A process for separation of siliceous gangue from an aqueous pulp of finely divided iron ore containing 10 to 70 percent solids comprising mixing with the pulp 0.5 to 4.0 pounds of Portland cement per ton of feed ore, 1 to 5 pounds per ton of feed ore of higher fatty acid anion active collector, and 0.5 to 8.0 pounds per ton of feed ore of solubilized starch, adjusting the pH value of the pulp to 10.0 to 12.0, and subjecting the pulp thus prepared to froth flotation.

4. A process for separation of siliceous gangue from an aqueous pulp of finely divided iron ore containing 10 to 70 percent solids comprising mixing with the pulp 0.5 to 4.0 pounds of Portland cement per ton of feed ore, 1 to 5 pounds per ton of feed ore of a mixture of fatty and resin acids anion active collector, and 0.5 to 8.0 pounds per ton of feed ore of solubilized starch, adjusting the pH value of the pulp to 10.0 to 12.0, and subjecting the pulp thus prepared to froth flotation.

5. In the froth flotation of gangue particles from an aqueous pulp of finely divided iron ore having a siliceous gangue, wherein the gangue particles are collected with 1.0 to 5.0 pounds of an anion active agent per ton of feed ore on a dry basis, said reagent being of the group consisting of resin acids, higher fatty acids, resin acid soaps, higher fatty acid soaps and mixtures of the foregoing, and the iron mineral particles are depressed with 0.5 to 8.0 pounds of solubilized starch per ton of feed ore on a dry basis, the improvement which consists in the activation of said gangue particles with 0.5 to 4.0 pounds of Portland cement per ton of feed ore on a dry basis, the pH value of the pulp being 10.0 to 12.0.

6. In the froth flotation of gangue particles from an aqueous pulp of finely divided iron ore having a siliceous gangue, wherein the gangue particles are collected with 1.0 to 5.0 pounds of talloel soap per ton of feed ore on a dry basis and the iron mineral particles are depressed with 0.5 to 8.0 pounds of solubilized starch per ton of feed ore on a dry basis, the improvement which consists in the activation of said gangue particles with 0.5 to 4.0 pounds of Portland cement per ton of feed ore on a dry basis, the pH value of the pulp being 10.0 to 12.0.

7. In the froth flotation of gangue particles from an aqueous pulp of finely divided iron ore having a siliceous gangue, wherein the gangue particles are collected with 1.0 to 5.0 pounds of a mixture of resin acid soap and higher fatty acid soap per ton of feed ore on a dry basis and the iron mineral particles are depressed with 0.5 to 8.0 pounds of solubilized starch per ton of feed ore on a dry basis, the improvement which consists in the activation of said gangue particles with 0.5 to 4.0 pounds of Portland cement per ton of feed ore on a dry basis, the pH value of the pulp being 10.0 to 12.0.

8. In the froth flotation of gangue particles from an aqueous pulp of finely divided iron ore having a siliceous gangue, wherein the gangue particles are collected with 1.0 to 5.0 pounds of an anionic reagent per ton of feed ore on a dry basis, said reagent being of the group consisting of resin acids, higher fatty acids, resin acid soaps, higher fatty acid soaps and mixtures of the foregoing, and the iron mineral particles are depressed with 0.5 to 8.0 pounds of solubilized starch per ton of feed ore on a dry basis, the improvement which consists in the activation of said gangue particles with 0.5 to 4.0 pounds of Portland cement per ton of feed ore on a dry basis, the pulp having a pH value of 10.0 to 12.0 obtained by introducing an alkali of the group consisting of sodium hydroxide, potassium hydroxide, and sodium metasilicate.

9. The process of preparing oxidized iron ore having siliceous gangue for froth flotation of the gangue comprising mixing the crushed ore with water to form an aqueous pulp containing 10 to 70 percent by weight of solids, introducing 0.5 to 4.0 pounds of Portland cement per ton of dry solids to the pulp, grinding the solids in the pulp to approximately minus 100 mesh, introducing 0.5 to 8.0 pounds of solubilized starch per ton of dry solids in the pulp, introducing 1.0 to 5.0 pounds of an anion active collector to the pulp, said collector being of the group consisting of resin acids, higher fatty acids, resin acid soaps, higher fatty acid soaps, and mixtures of the foregoing, and adjusting the pH value of the pulp to 10.0 to 12.0.

RONALD J. MORTON.

REFERENCES CITED

The following references are of record in the file of this patent:

UNITED STATES PATENTS

| Number | Name | Date |
|---|---|---|
| 2,364,777 | Brown | Dec. 12, 1944 |

OTHER REFERENCES

Taggart: Handbook of Mineral Dressing, 1945, section 12, pages 25–26.